United States Patent
Njaastad et al.

(10) Patent No.: US 9,107,449 B2
(45) Date of Patent: Aug. 18, 2015

(54) METHOD FOR CUSTOMIZING A BEVERAGE'S CARBONATION LEVEL

(71) Applicants: David K. Njaastad, Palatine, IL (US); Vincenzo DiFatta, Wood Dale, IL (US); Jeffrey DeBuhr, Bartlett, IL (US)

(72) Inventors: David K. Njaastad, Palatine, IL (US); Vincenzo DiFatta, Wood Dale, IL (US); Jeffrey DeBuhr, Bartlett, IL (US)

(73) Assignee: Cornelius, Inc., St. Paul, MN (US)

( * ) Notice: Subject to any disclaimer, the term of this patent is extended or adjusted under 35 U.S.C. 154(b) by 0 days.

(21) Appl. No.: 14/249,004

(22) Filed: Apr. 9, 2014

(65) Prior Publication Data
US 2014/0363548 A1     Dec. 11, 2014

Related U.S. Application Data

(60) Provisional application No. 61/831,511, filed on Jun. 5, 2013.

(51) Int. Cl.
*A23L 2/54*     (2006.01)

(52) U.S. Cl.
CPC ....................... *A23L 2/54* (2013.01)

(58) Field of Classification Search
CPC ........ A23V 2250/11; A23L 2/40; A23L 2/54; B01F 3/04794; B01F 3/04801; B01F 3/04808; B01F 3/04815; B01F 3/04106; B01F 3/04439; B01F 3/04978; B57D 1/0057; B57D 1/0058; B57D 1/0059; B57D 1/006; B57D 1/0071; B57D 1/0074; B57D 1/0075; B57D 1/0406; B57D 1/0425
USPC .................................. 426/477, 474
See application file for complete search history.

(56) References Cited

U.S. PATENT DOCUMENTS 1,561,036 A * 11/1925 Sugden ........................... 141/64
1,960,640 A    5/1934 Lajeunesse
(Continued)

FOREIGN PATENT DOCUMENTS

WO    WO 0187472         11/2001
WO    WO 2012162762   * 12/2012

OTHER PUBLICATIONS

Fulcher How to Use the SodaStream Jet YouTube Feb. 11, 2012 [retrieved on Feb. 26, 2014] Retrieved from the Internet:<URL:http:www.youtube.com/watch?v=bf9MVEel5XM> entire video, (8 pages).
(Continued)

*Primary Examiner* — Anthony Weier
(74) *Attorney, Agent, or Firm* — Andrus Intellectual Property Law, LLP

(57) ABSTRACT

The present invention recognizes the need for an apparatus and method for creating carbonated beverages having a customizable carbonation level. The invention uses a CPU to control an inlet valve which connects a tank of pressurized carbon dioxide to a vessel containing the beverage to be carbonized. The tube connecting the tank of pressurized carbon dioxide to the vessel contains an orifice for reducing the carbon dioxide's flow rate, thereby increasing control over the amount of carbon dioxide introduced to the vessel. A motor agitates the vessel, causing the carbon dioxide to become absorbed in the beverage. During the pressurization process, the pressure inside the vessel is monitored by the CPU to determine whether more CO2 should be added to the vessel. An outlet valve causes excess pressure to drain from the vessel. An outlet orifice causes the pressure to release gradually, thus preventing the beverage from foaming.

9 Claims, 5 Drawing Sheets

(56) References Cited

U.S. PATENT DOCUMENTS

| | | | |
|---|---|---|---|
| 2,006,313 A | | 6/1935 | Geddes |
| 2,556,038 A | * | 6/1951 | Kollsman .................... 261/61 |
| 4,208,903 A | | 6/1980 | Hopper et al. |
| 4,251,473 A | | 2/1981 | Gilbey |
| 4,323,090 A | | 4/1982 | Magi |
| 4,481,986 A | | 11/1984 | Meyers |
| 4,518,541 A | | 5/1985 | Harris |
| 4,719,056 A | | 1/1988 | Scott |
| 4,785,973 A | | 11/1988 | Kobe |
| 4,850,269 A | | 7/1989 | Hancock et al. |
| 4,869,396 A | * | 9/1989 | Horino et al. .................. 222/54 |
| 4,940,212 A | | 7/1990 | Burton |
| 4,999,140 A | | 3/1991 | Sutherland et al. |
| 5,118,009 A | | 6/1992 | Novitsky |
| 5,156,871 A | * | 10/1992 | Goulet et al. ............. 426/477 |
| 5,192,513 A | | 3/1993 | Stumphauzer et al. |
| 5,260,081 A | | 11/1993 | Stumphauzer et al. |
| 5,299,715 A | | 4/1994 | Feldman et al. |
| 5,460,846 A | | 10/1995 | Stumphauzer et al. |
| 5,531,254 A | | 7/1996 | Rosenbach |
| 5,549,037 A | | 8/1996 | Stumphauzer et al. |
| 5,592,867 A | | 1/1997 | Walsh et al. |
| 6,041,970 A | | 3/2000 | Vogel et al. |
| 6,073,811 A | | 6/2000 | Costea et al. |
| 6,167,718 B1 | | 1/2001 | Halimi et al. |
| 6,439,549 B1 | | 8/2002 | Lööv |
| 6,530,400 B2 | | 3/2003 | Nelson |
| 7,114,707 B2 | | 10/2006 | Rona et al. |
| 7,267,247 B1 | | 9/2007 | Crunkleton, III et al. |
| 2007/0158371 A1 | | 7/2007 | Lupfer |
| 2010/0096040 A1 | | 4/2010 | Litto |
| 2011/0020508 A1 | | 1/2011 | Santoiemmo |
| 2011/0113972 A1 | | 5/2011 | Tatera |
| 2011/0115103 A1 | | 5/2011 | Tatera |
| 2011/0180565 A1 | | 7/2011 | Racino et al. |
| 2011/0226343 A1 | | 9/2011 | Novak et al. |
| 2011/0300275 A1 | | 12/2011 | Lackey et al. |
| 2012/0098148 A1 | * | 4/2012 | Koslow et al. ............... 261/64.3 |
| 2012/0292790 A1 | | 11/2012 | Tatera |
| 2013/0106690 A1 | | 5/2013 | Lim |
| 2014/0099405 A1 | | 4/2014 | Boarman et al. |
| 2014/0255574 A1 | | 9/2014 | Njaastad et al. |

OTHER PUBLICATIONS iSi Twist 'N Sparkle Beverage Carbonating System YouTube video [online], isinorthamerica Mar. 23, 2011 [retrieved on Mar. 11, 2011] Retrieved from the Internet: <URL:www.youtube.com/watch?v=ySSXdwTs-cY>, (3 pages).

Perlini Carbonated Cocktail System YouTube video [online] Perlage Systems Jan. 11, 2010 [retrieved on Mar. 11, 2014] Retrieved from the Internet: <URL:www.youtube.com/watch?v=fhle9b4mjC4&feature=relmfu>, (3 pages).

Sodastream video demo [online], [retrieved on Mar. 11, 2014] Retrieved from the Internet: <URL:www.sodastreamusa.com/PopUps/VideoDemo.html>, (1 page).

Sodastream webpage [online], [retrieved on Oct. 8, 2012] Retrieved from the Internet:<URL:www.sodastream.com/fizz/>, (1 page).

ISR and Written Opinion for International Patent Application No. PCT/US2013/065763 mailed Mar. 18, 2014, (13 pages).

ISR and Written Opinion for International Patent Application No. PCT/US2014/022048 mailed Jun. 27, 2014, (10 pages).

ISR and Written Opinion for International Patent Application No. PCT/US2014/033040 mailed Aug. 27, 2014, (7 pages).

IPRP for International Patent Application No. PCT/US2013/065763 mailed Sep. 25, 2014 (16 pages).

ISR and Written Opinion for International Patent Application No. PCT/US2014/040509 mailed Oct. 1, 2014 (11 pages).

IPRP for International Patent Application No. PCT/US2014/022048 mailed Feb. 18, 2015 (9 pages).

* cited by examiner

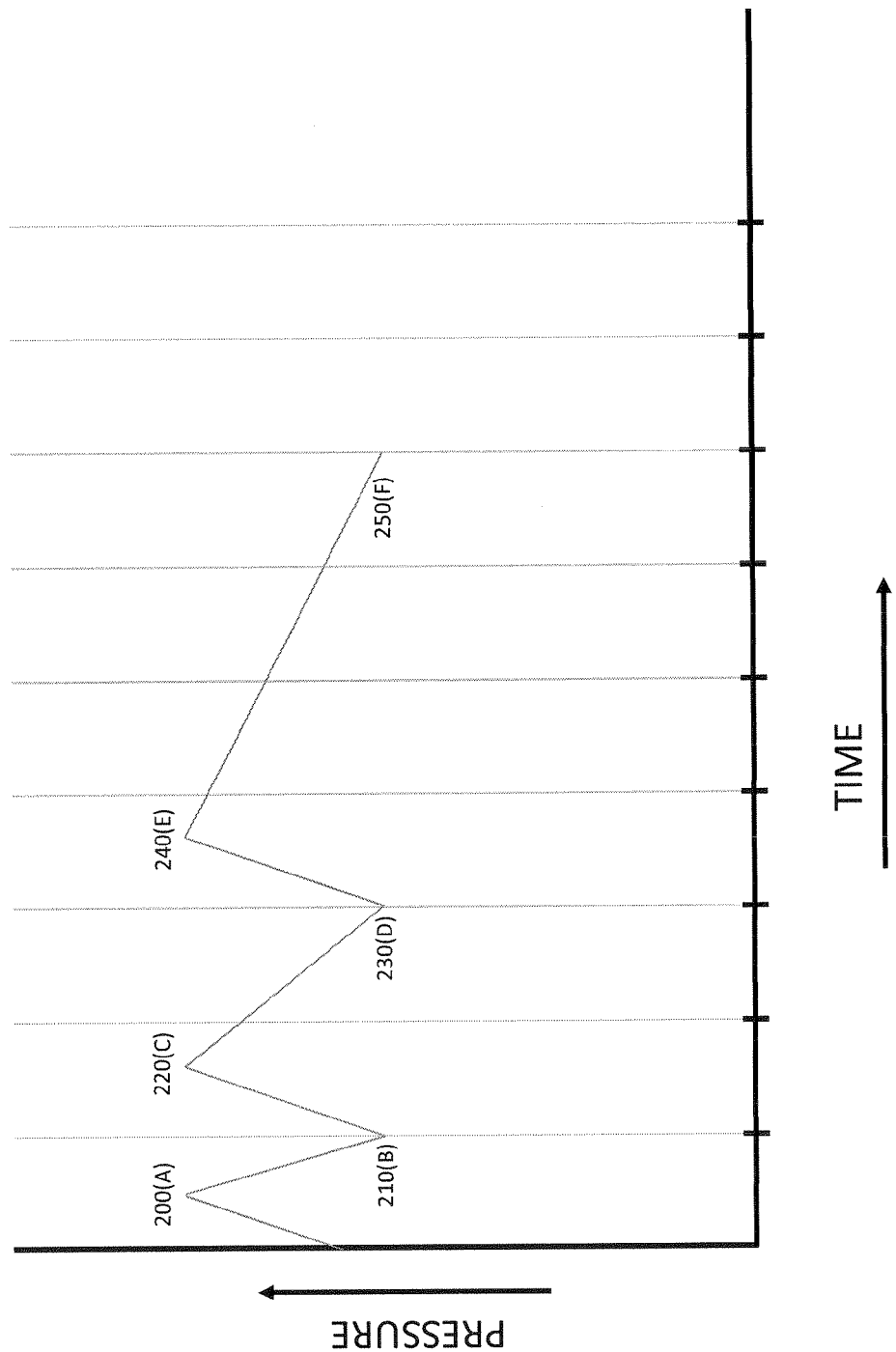

METHOD FOR CUSTOMIZING A BEVERAGE'S CARBONATION LEVEL

CLAIM TO PRIORITY

This present application claims the benefit of U.S. Provisional Application No. 61/831,511 filed on Jun. 5, 2013 and incorporates by reference the application in its entirety. The present application also incorporates by reference, in its entirety, U.S. application Ser. No. 13/908,847, entitled "Method And Apparatus For Carbonating A Liquid," filed on Jun. 3, 2013, in the name of Nicholas Giardano.

FIELD OF THE INVENTION

The present invention relates to a method and apparatus for carbonation of a liquid, more particularly, to a method and apparatus for creating a carbonated batch product at a customized level of carbonation based upon the individual desire of the customer.

BACKGROUND OF THE INVENTION

Carbonated water is generally formed by introducing a pressurized liquid and pressurized carbon dioxide gas into a carbonator tank. The pressure of the contents of the tank forces the carbon dioxide into the liquid, thus forming a carbonated liquid. Typically such carbonator tanks are bulky, large, and increase the manufacturing cost of a beverage dispensing system.

Current carbonated beverages may be formed by using a carbonator to carbonate a liquid source and then introducing a flavored syrup concentrate to make a carbonated beverage. Additionally, prior art devices may include a small carbon dioxide cartridge that introduces carbonation under pressure into a tank of water and then add the syrup or other ingredients to create a finished beverage.

Existing prior art teaches that carbonated beverages can be created by using a carbonator to carbonate water, and then mixing the carbonated water with a flavored syrup concentrate (such as concentrated cola components) to make a carbonated beverage. Also, machines are available that use a small CO2 cartridge to introduce carbonation into a mixed drink. But in the prior art devices, the amount of carbonation that can be introduced into a beverage is not variable, nor does the device operate to agitate the beverage after CO2 has been introduced. An additional limitation of the prior art devices is that they do not have the ability to control the foaming created when syrups or other products are mixed and carbonated.

However, prior art carbonation apparatuses are limited in the amount of carbonation that they introduce to the beverage because they do not agitate the beverage or have the ability to vary the pressure to create various carbonation levels, for example, low, medium and high levels of carbonation. Additionally, typical prior art apparatuses may be utilized to only carbonate a water source and do not carbonate a finished beverage.

There is therefore a need in the art for a method and apparatus that provides reliable levels of carbonation to a beverage on an individual small batch basis such that the carbonation level may be adjusted to various levels based upon the individual needs of a customer.

SUMMARY OF THE INVENTION

The present invention provides a batch carbonation process in which a user introduces a liquid into a vessel, locks the vessel to an agitation mechanism, and selects a level of carbonation. Based on the level of carbonation selected by the user, a CPU operates to open a valve to introduce pressurized carbon dioxide into the vessel. The agitation mechanism operates to place a force on the liquid within the vessel, thus increasing the surface area of the contact between the liquid (which may be partially atomized) and the carbon dioxide gas within the vessel. Furthermore, the present invention reduces the rate of flow of the pressurized carbon dioxide gas into the vessel by utilizing an orifice. Using a transducer, the invention measures the pressure of the carbon dioxide gas, and communicates the pressure measurement to the CPU, which adjusts the pressure within the vessel by opening and closing the inlet valve in accordance with the level of carbonation selected by the user until the selected level of carbonation is achieved. The CPU then stops the agitation mechanism upon completion of the carbonation cycle. Additional features of the invention include venting the pressure within the vessel after the desired level of carbonation has been obtained and controlling the rate of flow of the gas exiting the vessel by utilizing an orifice.

A further feature of the invention is controlling the opening and closing of an outlet valve by the CPU upon completion of the carbonation process.

DESCRIPTION OF THE DRAWINGS

FIG. 5 is an example of an optimal carbonation chart.

DETAILED DESCRIPTION OF THE PREFERRED EMBODIMENT

Carbonation is the process of dissolving carbon dioxide into a solution of water under pressure. It is commonly used in the creation of soft drinks, tonic water and other carbonated drinks. Effervescence is the escape of gas from an aqueous solution. In many consumer products, such as soft drinks, for example, Coca-Cola, 7-Up and Pepsi, carbonation (more particularly, the effervescence of the escaping gas) enhances the flavor of the beverage. Carbonated beverages contain dissolved carbon dioxide. The process of dissolving carbon dioxide ($CO_2$) in water is called carbonation. Carbonation may occur naturally from fermentation or a mineral source. However, most carbonated soft drinks are carbonated utilizing carbon dioxide which is artificially added to the beverage. Artificial carbonation is typically performed by dissolving carbon dioxide under pressure into a liquid.

This invention can be used for carbonation of a liquid inside a vessel. The liquid is not carbonated when it is placed in the vessel. Carbonation occurs through a process in which carbon dioxide is introduced into the vessel containing a liquid. The amount of carbon dioxide absorbed by the liquid is controlled by the rate with which the carbon dioxide is introduced in the vessel. The user thus has the option to create beverages having varying levels of carbonation to satisfy the palate of the consumer. This invention can be used with various liquids, such as juices, water, cola drinks, or other beverages. The present invention focuses on customizing the level of carbonation in a liquid to satisfy a customer's taste.

Figure 1:
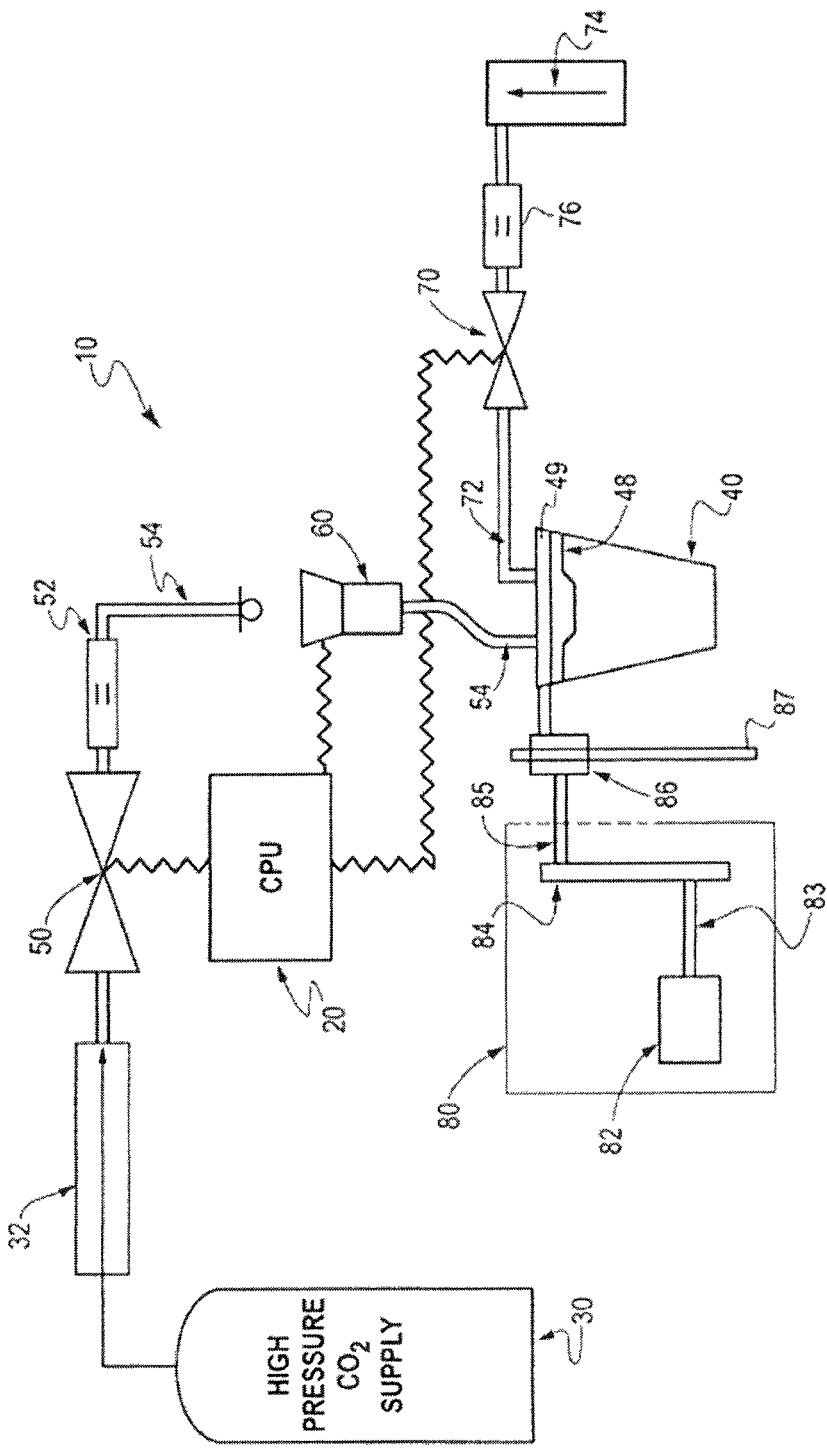
FIG. 1 is a schematic of the carbonation process.

Referring to FIG. 1, there is shown the apparatus 10 used for preparing the batch carbonation of various liquids. The process is controlled by a Central Processing Unit ("CPU") 20 that controls an inlet valve 50 and an outlet valve 70. The CPU 20 receives input data from a transducer 60 which monitors the pressure in the inlet flow line 54. The CPU 20 is preprogrammed to recognize the various pressure readings obtained from the transducer 60 and acts accordingly to open and/or close the inlet valve 50, which may be a solenoid type valve or other valve, to control the level of carbon dioxide gas introduced into the vessel 40. The CPU 20 further operates to activate the agitation mechanism 80 upon starting the system. Additionally, the CPU 20 operates to open the outlet valve 70 upon completion of the carbonation process.

Figure 2:
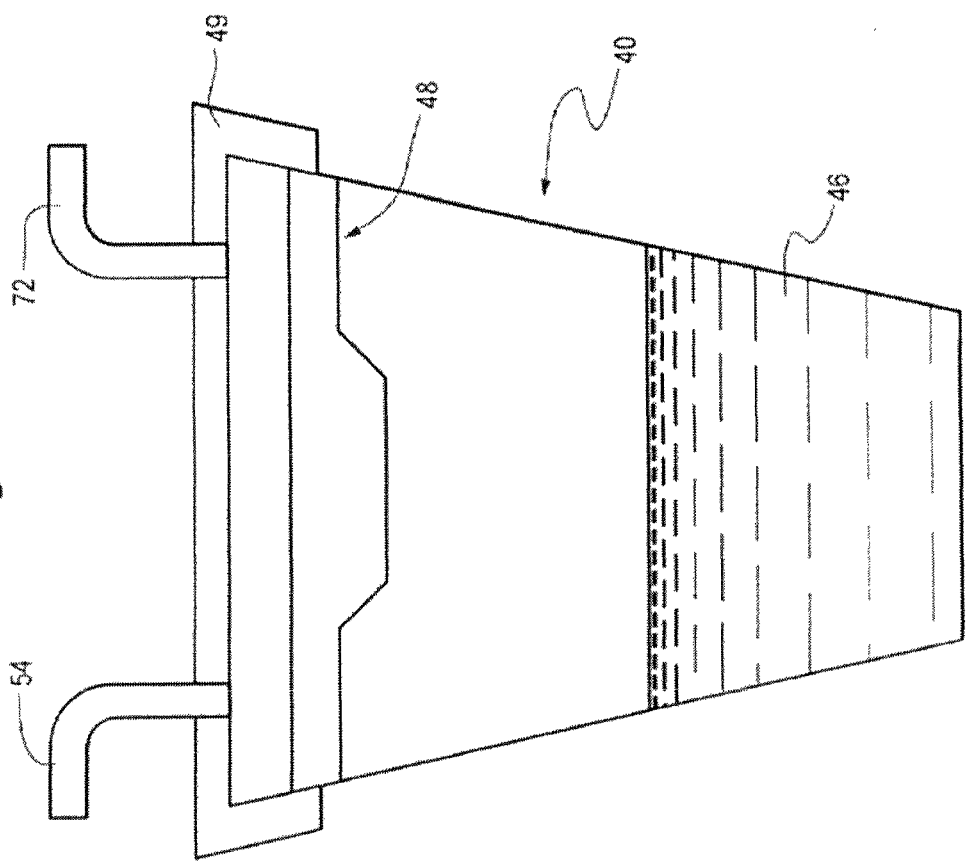
FIG. 2 is a cross-section of the pressure mixing vessel.

As seen in FIG. 2, the invention utilizes a vessel 40 into which an operator may introduce a liquid 46. It is preferable that the vessel 40 be made of stainless steel. However, it could be made of other material provided that the material is sufficient to withstand pressure as high as 100 pounds per square inch ("PSI") during the carbonation process. The user may enter a desired volume of liquid 46 into the vessel 40, provided that there is at least some empty space in the vessel 40 which allows mixing of the liquid with the carbon dioxide. The optimal ratio between empty space (i.e. air) and liquid 46 within the vessel 40 is two-thirds volume of liquid and one-third volume of empty space. However, this ratio can be varied from as low as 5% air space above the liquid to as high as 95% air space above the liquid volume. Regardless of the ratio of liquid 46 to empty space in the vessel 40, the liquid 46 in the vessel 40 will carbonate to some level. A higher ratio of empty air space to liquid volume results in a greater rate of carbonation of the liquid 46. The inverse is true for a lower ratio of air to liquid 46 in the vessel 40. Moreover, it is preferable to introduce liquid 46 at a temperature below 40° F. to help effectuate the carbonation process or, alternatively, introduce ice into the vessel 40 along with the liquid 46 to reduce the temperature of the liquid.

The vessel 40 may also contain a seal 48. The user may select a level of carbonation on the user input interface (not shown) which communicates the selected level to the CPU 20. The same may be done with the volume of liquid the user placed in the vessel 40.

Within the housing (not shown) of the batch carbonation mechanism, there is a chamber to receive the vessel 40. The chamber includes a locking mechanism 49 which seals and locks the vessel 40 into place within the housing. The housing contains an agitation mechanism 80. The agitation mechanism 80 comprises a motor 82 which turns a shaft 83. The shaft 83 operates to rotate a cam 84 having a linkage 85. Rotation of the cam 84 operates to move linkage 85 up and down. The linkage 85 is connected to a platform 86 to which the locking mechanism 49 is fixed. The platform 86 moves up and down along a guide rail 87 in response to rotation of the motor 82. In this configuration, the platform 86 moves up and down along the guide rail 87. Since the platform 86 holds the vessel 40, the vessel 40 also moves up and down along the guide rail 87. The vessel 40 moves in a reciprocal manner to a maximum upward position and a minimum downward position along the guide rail 87. While the preferred embodiment demonstrates the movement of the vessel 40 in an upper and lower maximum position, other agitation configurations may be utilized such as, by way of example, rotation, oscillation and/or horizontal reciprocal movement.

One aspect of the invention recognizes that a significant jolting force should be placed upon the liquid 46 contained in the vessel 40 when the vessel 40 reaches its maximum upward and minimum downward positions. The strong force created by the sudden change in direction of the movement of the vessel 40, for example, from an upward movement to a downward movement at the maximum upward position of the vessel 40, causes a jolting force to be applied to the liquid 46 within the vessel 40. The effect of the jolting force acting upon the liquid 46 is that a portion of the liquid 46 within the vessel 40 will atomize. During atomization, the liquid 46 is suspended within the carbon dioxide gas to increase the surface area of the contact between the carbon dioxide gas and the suspended liquid. The greater surface area between the carbon dioxide and the liquid 46 causes a greater carbonation level. This is because the atomized liquid has a different pressure than the carbon dioxide, which causes the carbon dioxide to be absorbed into the liquid 46, thus forming a carbonated liquid having a specified volume of carbonation. In order to sufficiently atomize the liquid 46 within the vessel 40, a force of 3 gravitational units (G) or greater should be placed upon the liquid 46 within the vessel 40. It has been found that the optimal force to atomize the liquid 46 is approximately 6G force units applied at the two extremes of the movement of agitation mechanism 80.

The locking mechanism 49 of the vessel 40 includes an inlet flow line 54 and outlet flow line 72. The inlet flow line 54 introduces carbon dioxide into the vessel 40. The outlet flow line 72 permits excess pressure or carbon dioxide to exit the vessel 40 upon completion of the carbonation process. The inlet flow line 54 is connected to a high pressure carbon dioxide supply 30. The high pressure carbon dioxide supply 30 has a regulator 32 which reduces the pressure of the carbon dioxide exiting the regulator 32 to approximately 100 PSI. The high pressure carbon dioxide supply 30 and regulator 32 are controlled by an inlet valve 50 which may open and close. The inlet valve 50 is opened and closed based upon input from the CPU 20. The CPU 20 receives input from the transducer 60 which supplies a reading of the pressure within the inlet flow line 54. The pressure in the inlet flow line 54 is the same as the pressure within the vessel 40. The CPU 20 is programmed to read the pressure within the inlet flow line 54 and determines the amount of carbon dioxide that needs to be introduced into the vessel 40. The CPU 20 will open inlet valve 50 until a predetermined pressure is achieved in the vessel 40. The pressure is measured by the transducer 60. As the inlet valve 50 opens, the pressure within the vessel 40 increases to the predetermined pressure stored in the CPU 20. The apparatus functions as a closed loop control, wherein the transducer 60 provides feedback to the CPU 20 regarding the current pressure level within the inlet flow line 54, which is approximately the same pressure as in the vessel 40. The vessel 40 is brought to a predetermined pressure setting based on a desired carbonation level. The closed loop then maintains the predetermined pressure within the vessel 40 as the liquid 46 within the vessel 40 is being agitated by the agitation mechanism 80.

As the liquid 46 within the vessel 40 is agitated, the liquid 46 becomes atomized, or partially reduced to droplet form, and absorbs the carbon dioxide into the liquid 46. The pressure within the vessel 40 drops as the carbon dioxide is absorbed into the liquid 46. The CPU 20 detects when the pressure in the vessel has dropped below a certain level and opens inlet valve 50 to reintroduce carbon dioxide into the vessel 40. In this way, the CPU 20 can maintain a constant pressure within the vessel 40. This process is continued until the liquid 46 becomes saturated with carbon dioxide.

Figure 3:
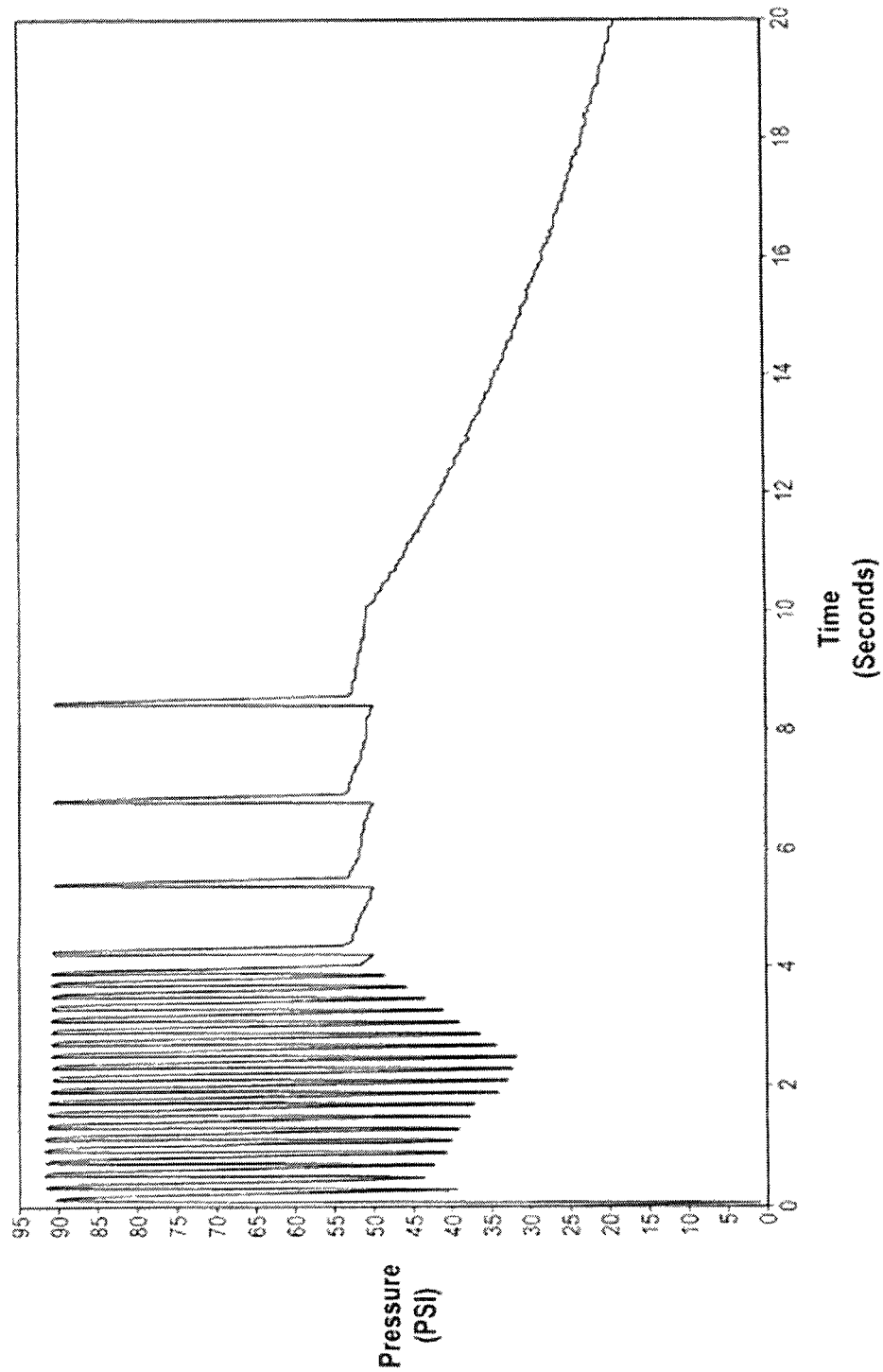
FIG. 3 is a chart comparing time (seconds) to pressure (PSI) in the embodiment of FIG. 1.

A problem faced in the development of the present invention is the fact that pressurized carbon dioxide moves through the tubing and into the vessel 40 so quickly that the regulator 32, inlet valve 50, and CPU 20 cannot provide meaningful regulation of the flow of carbon dioxide. In other words, the carbon dioxide flows so fast that the vessel 40 receives a high amount of carbon dioxide even when the regulator 32, inlet valve 50, and CPU 20 are configured to introduce only a low amount of carbon dioxide. An example of this problem is shown in FIG. 3, which shows pressure as measured by the transducer 60 during operation of the agitation mechanism 80 after the inlet valve 50 has been opened to introduce pressurized carbon dioxide gas into the vessel 40. More specifically, the chart of FIG. 3 shows the pressure in the vessel 40 as a function of time, in an exemplary scenario in which the agitation mechanism 80 is activated, and pressurized carbon dioxide is being introduced through inlet valve 50. As can been seen, the slope of the rate of increase of carbon dioxide into the vessel 40 is extremely high, which means, in essence, that the carbon dioxide is absorbed into the liquid 46 at a faster rate than the CPU 20 can react to close inlet valve 50. The graph depicts the increase in pressure within the vessel 40 from 0 PSI to 90 PSI within approximately ⅕ of a second. This rapid increase in pressure cannot be conveyed to the CPU 20 by the transducer 60 in such a short amount of time. Nor can the CPU 20 signal to close the inlet valve 50 in such a small time increment. What occurs is that the carbon dioxide is rapidly absorbed into the liquid 46 as depicted in FIG. 3. The CPU 20 cannot signal the inlet valve 50 to close until after the liquid 46 has already become fully saturated with carbon dioxide. In essence, the liquid 46 reaches a saturation point of carbon dioxide very rapidly, i.e. within fractions of a second. The device cannot be operated to carbonate the liquid 46 to lower saturation levels other than maximum saturation. The present invention solves this problem by slowing down the flow rate of carbon dioxide, thereby allowing the regulator 32, inlet valve 50, and CPU 20 sufficient time to control the carbon dioxide.

To solve the problem, an inlet orifice 52 may be positioned within the inlet flow line 54 or inlet valve 50 to reduce the slow rate of the carbon dioxide gas. The inlet orifice 52 reduces the flow rate of the high pressure carbon dioxide supply 30 into the vessel 40. The optimal range for the flow coefficient ($C_v$) is between 0.004 and 0.022. Other flow rates could be used depending on carbonation levels desired and how fast the CPU 20 could react to rapid changes in carbon dioxide pressure changes.

Figure 4:
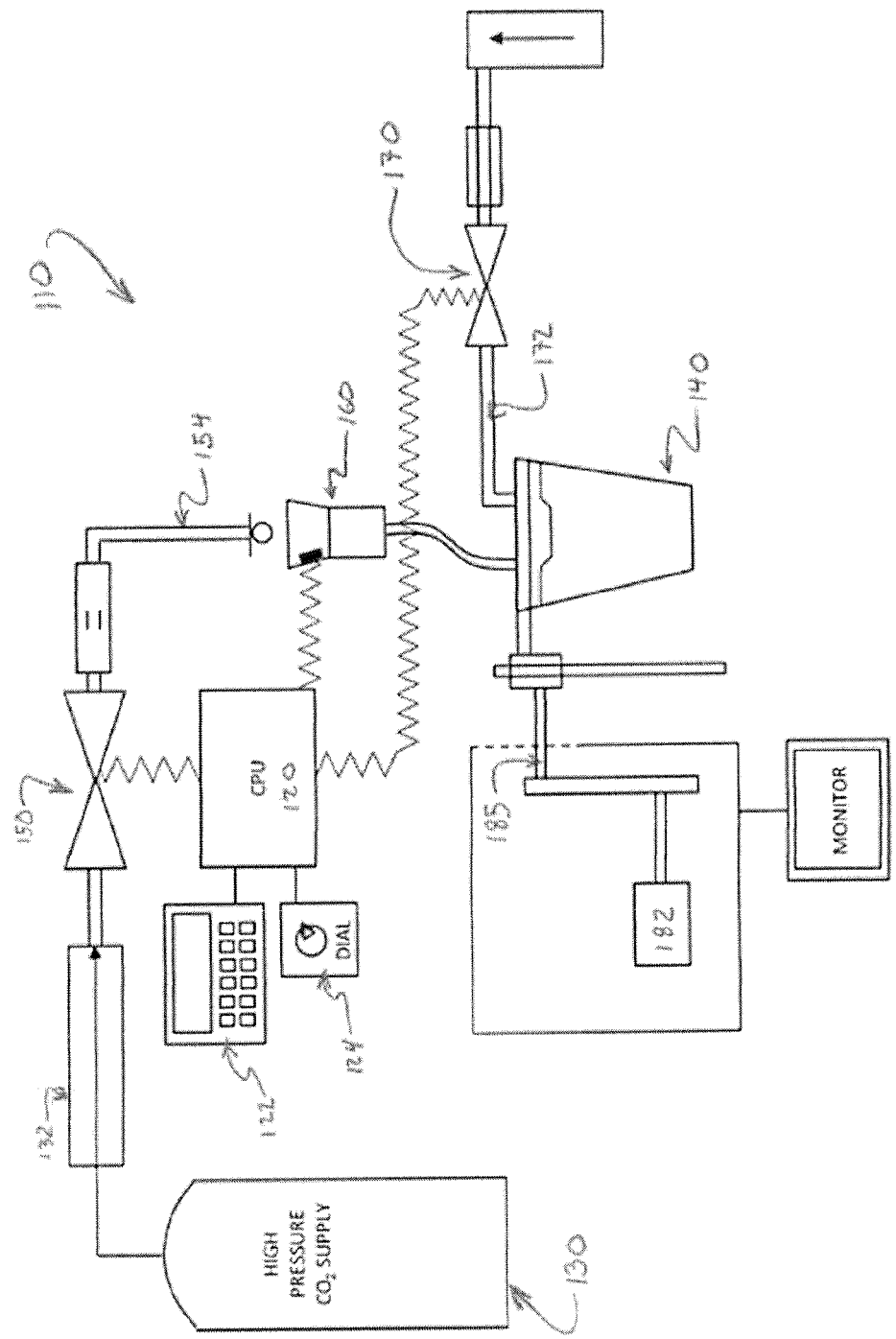
FIG. 4 is a schematic of an alternative embodiment of the carbonation process.

In an alternative embodiment, FIG. 4, the present disclosure includes a device 110 for creating customized carbonated beverages. The device includes a pressurized carbon dioxide (CO2) tank 130 that supplies CO2 through an inlet tube 154 and into a mixing vessel 140. The CO2 supply 130 includes a mechanical regulator 132 for controlling pressure. The regulator 132 provides the added safety feature of preventing over-pressurization of the device.

The CO2 tank 130 is connected to an inlet tube 154, which is connected to a mixing vessel 140. A transducer 160 may be positioned in the inlet tube 154 to measure the CO2 pressure in the mixing vessel 140, since the inlet tube 154 may have a pressure roughly equal to the mixing vessel 140. The transducer 160 may also be placed in the mixing vessel 140 itself. The inlet tube 154 further includes an inlet valve 150, which controls the flow of CO2 through the inlet tube 154 and into the mixing vessel 140. The mixing vessel 140 may also be attached to an outlet tube 172, through which excess pressure may be relieved after the carbonation process is complete. An exemplary device configuration is described in applicant's co-pending U.S. patent application Ser. No. 13/908,847, which is hereby incorporated by reference in its entirety.

The device for creating customized carbonated beverages may also include a CPU 120 connected to a user interface 122. The CPU 120 is connected to the transducer 160, to the inlet valve 150, and to an agitation mechanism 182. As such, the CPU 120 may receive an input from a user—for example, specifying a beverage size or a carbonation level—and use pressure readings from the transducer 160 to control the inlet valve 150 accordingly. In one embodiment, the CPU 120 and the other components may be connected to a PCX board.

In one embodiment, the user interface may include a dial 124 that allows the user to set a pressure (the pressure selected will determine the level of carbonation of the beverage). The selected pressure is received by the CPU 120, which then controls the inlet valve 150 to begin the flow of CO2 from the CO2 tank 130 to the mixing vessel 140. The pressure of CO2, flowing through the inlet tube 154, and into the mixing vessel 140 is measured by the transducer 160, or by any other type of pressure sensor. The pressure is converted to a voltage signal, which is supplied back to the CPU 120. In that way, the CPU 120 is able to continuously determine the current pressure level.

The CPU 120 continues allowing CO2 pressure to build until a predetermined pressure is reached. The CO2 pressure continues to build while the inlet valve 150 is in the open position, but the CPU 120 may also "pulse" the inlet valve 150 rather than maintaining it in a continuous open position.

The predetermined pressure level is supplied to the CPU 120 from the memory. More specifically, the memory stores a predetermined pressure level corresponding to each possible user selection on the user interface. In other words, if the user interface allows the user to select from a HIGH, MEDIUM, and LOW setting, then the memory contains one pressure level (measured in PSI for example) corresponding to each selection.

An agitation motor 182 is attached to a platform 185 that holds the mixing vessel 140. The motor 182 is electronically connected to the CPU 120 so that the CPU 120 can activate and deactivate the agitation motor 182. The agitation motor 182 causes the mixing vessel 140 to agitate the liquid and CO2 in the mixing vessel 140. For example, the mixing vessel 140 may be agitated between a maximum upward position and a minimum downward position, where each stroke is a minimum of 0.75", at a minimum rate of 280 RPM. The CPU 120 activates the agitation motor 182, and thus begins the agitation cycle, either when the CPU 120 opens the inlet valve 150 to begin building pressure, or once the predetermined pressure is achieved.

As shown in FIG. 5, agitation of the mixing vessel 140 causes the beverage inside the mixing vessel 140 to mix with the CO2 introduced through the inlet valve 150 and increase the pressure 200(A). As the CO2 is absorbed into the beverage, the pressure in the mixing vessel 140 drops 210(B). The CPU 120 receives the pressure readings from the transducer 160 (or other pressure sensor). Depending on the desired carbonation level of the beverage, it may be desirable to introduce an additional dose of pressurized CO2 into the mixing vessel 140. Thus, once the pressure drops below the predetermined level (because the agitation is causing the CO2 to absorb in the beverage), the CPU 120 may be programmed to again open the inlet valve 150 and bring the pressure level back to the original 220(C), predetermined level of pressure.

The pressure in the mixing vessel 140 will continue to drop 230(D) as the CO2 is absorbed into the beverage, whereupon more CO2 will be introduced into the mixing vessel 140 to again increase the pressure to a predetermined level 240(E). The time between each maximum and minimum pressure increases as the beverage becomes saturated with CO2 250 (F). FIG. 4 demonstrates the increase in time between the highs and lows of the pressure reading as the beverage becomes more saturated. For example, the time between 200 (A) to 210(B) is less than 220(C) to 230(D), which is less than

240(E) to 250(F). Likewise, the time between 210(B) to 230 (D) is less than the time between 230(D) to 250(F).

FIGS. 4, 5, and 6 of incorporated U.S. patent application Ser. No. 13/908,847 demonstrate a pressure reading where the CPU re-introduces pressure as the CO2 is absorbed. This cycle of reintroducing CO2 pressure may be continued for a predetermined time, or for a predetermined number of cycles. The amount of time, or number of cycles, is dictated by the desired carbonation level.

A lower level of carbonation may be achieved simply by introducing a predetermined first level of pressure and agitating the mixing vessel for a predetermined time. The time of agitation may be measured by the CPU 120 using a timer.

The CPU 120 may use a timer to measure the time between the pressure drops over the course of multiple cycles. For example, to create a highly carbonated beverage, the CPU 120 will control the inlet valve 150 to achieve a pressure of 90 PSI in the mixing vessel 140 when agitation begins. As the mixing vessel 140 is agitated, the pressure drops because CO2 is absorbed into the beverage. In this embodiment, the CPU 120 is programmed to allow the pressure to drop to approximately 60 PSI. When the transducer 160 determines that the pressure in the mixing vessel 140 has reached 60 PSI, the CPU 120 operates to open valve 150 to introduce CO2 gas into the mixing vessel 140 to raise the pressure within the mixing vessel 140 to 90 PSI. As agitation continues, the pressure again drops toward 60 PSI. This creates a "sawtooth" graph of pressure reading as shown in FIG. 3. The CPU 120 uses a timer to measure the time between the highs and/or lows of the pressure reading. In this embodiment, the time between the highs and lows is used to calculate the saturation level of the CO2 in the beverage. In theory, as the beverage becomes more saturated with carbonation, the rate at which it continues to absorb CO2 decreases. Therefore, as the beverage becomes more carbonated, the time between the highs and lows of the cycle increases. The CPU 120 uses the timer to measure the cycles, and ends the carbonation cycle once a desired saturation level is achieved. To implement this embodiment, one needs a CPU 120 and timer sensitive enough to detect the change in cycle time. These changes may be small, and thus difficult to detect. In this embodiment, the carbonation cycle (and therefore also the agitation) is not set to run for a predetermined amount of time; rather, the cycle continues until a particular spacing of highs and lows occurs. This provides the added benefit of maximizing the efficiency of the machine, since the machine will not run any longer (or shorter) than necessary.

Additional components of the user interface may include an indicator light that is on when the system is powered up, thus indicating to the user that the device is ready for use. A further light may be controlled by the CPU 120, which may activate the light to indicate that the transducer 160 is measuring a certain pressure level. Yet another light may indicate that the above described agitation process is completed, and it is safe to remove the mixing vessel. This light may be activated by the CPU 120 when the pressure level in the mixing vessel 140 has dropped below a certain level. For example, as a safety feature, it may be desirable to warn the user not to open the mixing vessel 140 until it contains less than 20 PSI.

After the carbonation cycle is finished, the excess pressurized CO2 is vented. The venting may occur through an outlet tube 172 connected to the mixing vessel 140, or the inlet tube 154 may be configured to also allow the release of pressure. The outlet tube may contain an outlet valve 170, which is controlled by the CPU 120. Once the CPU 120 has finished the carbonation cycle, the CPU 120 activates the outlet valve 170 to vent the excess CO2 pressure. The outlet valve 170 may further comprise a bleeder valve that can be adjusted to slow down the release of gas exiting the mixing vessel 140. Reducing the flow rate of the gas exiting the mixing vessel 140 has the added benefit of reducing the amount of foam that would be produced if the mixing vessel were rapidly vented.

While embodiments of the invention have been described in detail, various modifications and other embodiments thereof may be devised by one skilled in the art without departing from the spirit and scope of the invention, as defined in the appended claims.

What is claimed is:

1. A method for creating a customized carbonated beverage, comprising the steps of:
   receiving a user-selected carbonation level;
   storing, via a processor, the user-selected carbonation level on a memory connected to the processor;
   controlling, via the processor, a carbonation process including:
   controlling, via the processor, an inlet valve to open to allow pressurized carbon dioxide from a pressurized carbon dioxide supply to flow into a mixing vessel;
   controlling, via the processor, a motor to activate to agitate the mixing vessel for an agitation cycle;
   receiving pressure information from a transducer, the pressure information including a pressure level sensed in the mixing vessel by the transducer;
   monitoring the pressure level in the mixing vessel based on the received pressure information;
   controlling, via the processor, the inlet valve to close when the pressure information indicates a first predetermined pressure level is reached in the mixing vessel, wherein closing the inlet valve stops the pressurized carbon dioxide from flowing into the mixing vessel;
   controlling, via the processor, the inlet valve to open when the pressure information indicates a second, lower predetermined pressure level is reached in the mixing vessel, wherein opening the inlet value allows the pressurized carbon dioxide to flow into the mixing vessel;
   controlling, via the processor, a timer to measure a saturation time comprising a length of time between identifying the first predetermined pressure level in the mixing vessel and identifying the second predetermined pressure level in the mixing vessel based on the pressure information; and
   controlling the carbonation process to cease when the saturation time is greater than a predetermined saturation time, and controlling the carbonation process to repeat when the saturation time is less than the predetermined saturation time.

2. The method of claim 1, wherein the user-selected carbonation level is received through a user interface customized to receive one of a variety of carbonation levels selected by the user.

3. The method of claim 2, wherein the user interface includes a dial.

4. The method of claim 1, wherein controlling the carbonation process to cease includes stopping the motor from agitating the mixing vessel.

5. The method of claim 1, further comprising:
   receiving a user-selected beverage size.

6. The method of claim 5, further comprising:
   causing the motor to activate for a predetermined time corresponding to the user-selected beverage size.

7. The method of claim 1, wherein the motor is configured to agitate the mixing vessel between 3Gs and 6Gs of force.

8. The method of claim 1, wherein the pressurized carbon dioxide from the pressurized carbon dioxide supply flows through an inlet orifice before flowing into the mixing vessel to control a flow rate of the pressurized carbon dioxide flowing into the mixing vessel.

9. The method of claim 1, wherein controlling the inlet valve to open includes pulsing the inlet valve open and closed until the pressure level indicates the first predetermined pressure level is achieved within the mixing vessel.

\* \* \* \* \*